Nov. 27, 1923.

J. B. BARNES

NUT LOCK

Original Filed May 5, 1922

1,475,779

Inventor
Joseph B. Barnes
By Horace C. [Attorney signature]
Attorney

Patented Nov. 27, 1923.

1,475,779

UNITED STATES PATENT OFFICE.

JOSEPH B. BARNES, OF CLARK, MISSOURI.

NUT LOCK.

Application filed May 5, 1922, Serial No. 558,569. Renewed October 17, 1923.

*To all whom it may concern:*

Be it known that I, JOSEPH B. BARNES, a citizen of United States, residing at Clark, in the county of Randolph, State of Missouri, have invented certain new and useful Improvements in Nut Locks; and I do hereby declare the following to be a full, clear, and exact description of the invention, such as will enable others skilled in the art to which it appertains to make and use the same.

This invention relates to new and useful improvements in lock nuts, and is especially adapted for use in connection with rail joints, while other equally advantageous uses may be made of the nut.

One object of the invention is to provide a nut so constructed that one or more of the corner portions may be bent by the blow of a hammer out of its normal plane so as to bite into the surface of the work.

Another object is to provide a nut of this character which has means other than the corner portions for biting into the surface of the work to effectively prevent rotation of the nut in either direction, after having been properly driven home.

Other objects and advantages will be apparent from the following description when taken in connection with the accompanying drawings.

Figure 1:
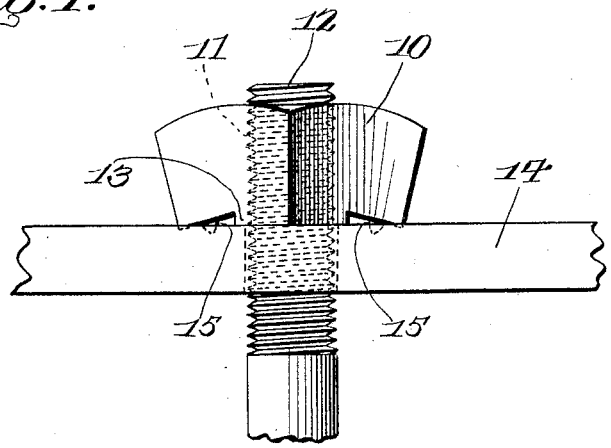
Figure 1 is an elevation of the nut in connection with a bolt and a plate, showing the nut in locking position.
Figure 2:
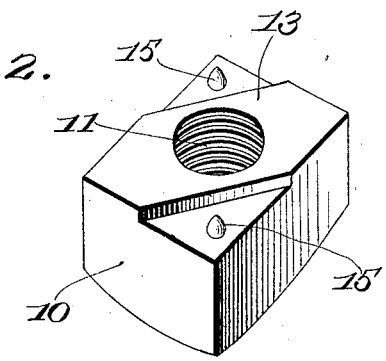
Figure 2 is an inverted perspective view of the nut.

Referring particularly to the accompanying drawing, 10 represents the body of the nut having the usual threaded opening 11 therethrough for engagement on the bolt 12. Formed diagonally across the inner or working face of the nut is a rib 13, which is adapted to engage against the work 14, and thus hold the nut body spaced a short distance from the work. Formed integrally on its inner face, and adjacent the other two diagonally opposite corners are the pointed lugs 15.

After the nut has been screwed home, that is, until the rib 13 firmly bears against the work 14, the diagonally opposite corners which carry the pointed lugs 15 are struck with a hammer so as to bend them inwardly against the work face 14, and out of the original plane of the body of the nut. The said corner portions will bite into the work 14, as will also the lugs 15, thus effectively holding the nut against turning, in either direction, on the bolt, due to any jarring or moving of the parts with which the device is used.

What is claimed is:

1. A locking nut comprising an angular body, means on the working face of the body for spacing certain corner portions of the body from the face of the work, said corner portions normally in the plane of the body being bendable out of the said plane in the direction of the work.

2. A locking nut comprising an angular body having means for contacting with work to space certain corner portions from the face of the work, said corner portions normally in the plane of the body being bendable by the blow of a tool out of the said plane and into contact with the work.

3. A locking nut comprising an angular body having corner portions normally lying in the plane of the body and bendable out of the said plane, and means forming a part of one face of the body to provide a fulcrum on which the corner portions are bendable.

4. A locking nut comprising an angular body having a transverse rib across its working face with the corner portions at opposite sides of the rib lying in the plane of the body and bendable out of the said plane.

5. A locking nut comprising an angular body having a rib extending diagonally across its working face between two corners thereof and with the remaining corner portions lying normally in the plane of the body and bendable out of the said plane.

6. A locking nut comprising an angular body having a rib extending across the working face between two diagonally opposite corner portions, the remaining corner portions being normally in the plane of the body and bendable out of the said plane and into contact with a piece of work.

7. A locking nut comprising an angular body having a rib extending across its working face between diagonally opposite corners, certain other of the corner portions being normally in the plane of the body and bendable out of the said plane in the direction of the rib, and work penetrating means on the working faces of the bendable corner portions.

8. A locking nut comprising an angular body having corner portions, a rib extending across the working face of the body between diagonally opposite corners, biting lugs formed on the working faces of certain other of the corner portions at opposite sides of the rib, said last named corner portions being normally in the plane of the body and bendable out of the said plane to bite into a piece of work and to move the biting lugs into engagement with the work.

In testimony whereof, I affix my signature, in the presence of two witnesses.

JOSEPH B. BARNES.

Witnesses:
W. R. COULSON,
J. H. WHARTON.